US006461395B1

(12) United States Patent
Kelly, III et al.

(10) Patent No.: US 6,461,395 B1
(45) Date of Patent: Oct. 8, 2002

(54) ROTATION MOLDED PARTICULATE COLLECTION BOTTLE

(75) Inventors: Gerald L. Kelly, III, Byron; Kurt E. Jones, Webster, both of NY (US)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/741,293

(22) Filed: Dec. 18, 2000

Related U.S. Application Data

(60) Provisional application No. 60/239,337, filed on Oct. 11, 2000.

(51) Int. Cl.[7] ........................................ B01D 35/30

(52) U.S. Cl. .................................. 55/428; 399/253

(58) Field of Search ........................ 55/428, 459.1; 399/253

(56) References Cited

U.S. PATENT DOCUMENTS 4,966,207 A * 10/1990 Howard et al. ............... 141/18

6,029,918 A * 2/2000 Sundberg ................ 241/169.1

OTHER PUBLICATIONS

LNP Engineering Plastics, Inc., Technical Data, Nov. 23, 1999.

Rotational Molding Process, Copyright 1999 Association of Rotational Molders.

Engineering Materials Properties & Selection, Fifth Edition, By: Kenneth G. Budinski, 1996 by Prentice—Hall in A simon & Schuster Co. Upper Saddle River, New Jersey 07458.

Rotec Product Description ICORENE C517 Oct. 2, 2000.

* cited by examiner

*Primary Examiner*—Robert A. Hopkins

(57) ABSTRACT

A rotation molded particulate collection bottle for a copier/duplicator machine, which is connectable to a particulates separation source, which is not prone to failure under vacuums required in the air circulation systems for copier/duplicator machines and which is rotation molded and has a wall thickness of at least about 0.20 inches.

12 Claims, 3 Drawing Sheets

ROTATION MOLDED PARTICULATE COLLECTION BOTTLE

RELATED U.S. APPLICATION DATA

This application claims the benefit of the disclosure and filing date of U.S. Provisional Application No. 60/239,337 filed Oct. 11, 2000.

FIELD OF THE INVENTION

This invention relates to a rotation molded particulate copier/printer/duplicator machine collection bottle which is not prone to failure under vacuums required in the air circulation systems for copier/printer/duplicator machines.

BACKGROUND OF THE INVENTION

In copier/printer/duplicator machines, a photoconductor film is commonly circulated past a primary charger, an imaging section, and a toner application section where a toner is applied to the image created in the imaging section. The photoconductor film is then passed into contact with paper or other transfer medium and the toner image is transferred to the paper, which is subsequently passed through a fuser system to fix the toner image to the receiver. In the operation of such machines it is common practice to withdraw the excess toner by a vacuum suction at selected locations in the machine, such as a brush cleaner used to recondition the photoconductor film after transfer of the toner image to the receiver before passing the film back to the primary charger. The air streams withdrawn are typically withdrawn from the machine by suction and passed to a cyclone separator where particulates are separated from the stream and passed to a particulates collection bottle. The gaseous stream is thereafter passed through a filter and to a blower.

The suction required is typically up to about 60 inches of water and it has been found that the commonly used blow molded parts of static dissipative extrusion polyethylene are prone to failure.

The blow molding process yields parts with high levels of molded-in stress and wide variations in wall thickness. The additives needed to provide static dissipation and flame retardant properties further reduce the mechanical properties of the base polyethylene resin. The result has been collection bottles that have cracked and allowed vacuum leaks while under the 35 to 50 inches of water vacuum load of the printer and copier cleaning systems. Alternative materials have been investigated for use in the blow molding process to produce more reliable bottles but none have been found.

Failures of the bottle by cracking or the like permits the reverse flow of the particulates, which may include toner, back upwardly into the cyclone separator and out of the cyclone separator with the gas. The blower prefilter is not designed to handle particulates in this quantity. As a result air contamination in the vicinity of the machine, and in the machine itself, can result. Such failures at a high frequency are unacceptable and a continuing search has been directed to the development of particulates collection bottles for use with copier/printer/duplicator machines, which are more reliable and are less prone to such failure.

SUMMARY OF THE INVENTION

According to the present invention, a more reliable collection bottle comprises a rotation molded particulates collection bottle for a copier/printer/duplicator machine comprising a rotation molded container having a top and a bottom, a wall thickness of at least about 0.20 inches and a particulates inlet.

DESCRIPTION OF THE PREFERRED EMBODIMENTS

In the description of the Figures, the same numbers will be used throughout to refer to the same or similar components.

Figure 1:
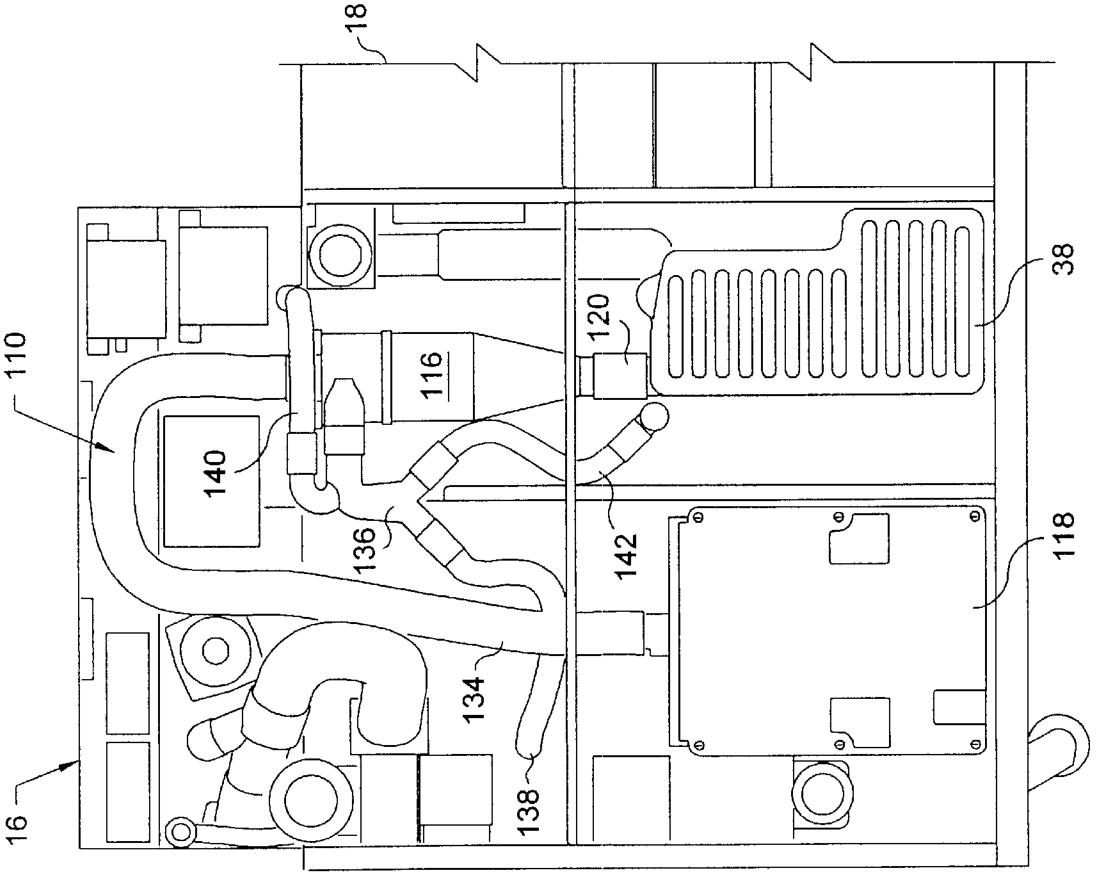
FIG. 1 is a schematic diagram of an air distribution system for a copier/printer/duplicator machine.

Referring now specifically to FIG. 1, an electrographic process cleaning system 110 is presented of the type configured to have a particle collection container 38. A vacuum is imposed upon the cleaning system 110, by a vacuum source 118 for example. In the example presented, the vacuum source 118 also drives the flow of cleaning gas throughout the cleaning system 110. Although not limited to a particular electrographic process, the invention is particularly useful in an electrographic process that implements a photoconductive film loop and dry toner development, also known as electrophotography. While the exemplary electrographic process cleaning system 110 presented in FIG. 1 is configured in a manner suitable for cleaning dry electrographic toner and paper particles in a film loop electrographic process, it is not intended to limit the invention in such manner. The cleaning system 110 is part of an electrographic marking engine 16, of which only a portion is shown, broken away at line 18.

The cleaning system 110 comprises a particle separator 116 in fluid communication with the particle collection container 38 via a conduit 120. The vacuum source 118 is in fluid communication with the particle separator 116 via a vacuum supply conduit 134. The particle separator 116 is also in fluid communication with a manifold 136 which, in turn, is in fluid communication with a film loop cleaning station (not shown) via a first conduit 138, a transfer roller cleaning station (not shown) via a second conduit 140, and a toning station dust collector (not shown) via a third conduit 142. The vacuum draws waste particles from the film loop cleaning station, transfer roller cleaning station, and the toning station dust collector through the conduits 138, 140 and 142, through the manifold 136, and into the particle separator 116 where the particles are separated from the flow and drop into the particle collection container 38. The vacuum source 118 draws the cleaned flow out of the particle separator 116 through conduit 134. The structure of the film loop cleaning station, transfer roller cleaning station, and toning station dust collector are known in the art. Such apparatus is provided in the Digimaster® 9110 brand digital high volume printer manufactured by Heidelberg Digital L.L.C. of Rochester, N.Y.

It is desirable that the particle collection container 38, also referred to herein as a bottle, be a static dissipative vessel. Accordingly, a static dissipative extrusion grade polyethylene plastic resin has been used to produce bottles by blow molding. These bottles have high levels of molded-in stress and wide variations in wall thickness and have been found to be less reliable than desired. The material additives needed to provide the static dissipation and flame retardant properties also reduce some mechanical properties of the base polyethylene resin. The result has been parts that have cracked and allowed vacuum leaks while under the 35 to 50 inches of water vacuum load of the copier/printer/duplicator cleaning systems, especially under repeated cycles of increased and reduced vacuum. A search for alternative materials has been unsuccessful in developing other materials, which are suitable replacements in the blow molding process to produce reliable parts. Blow molding is a well-known process and is described in Engineering Materials Properties and Selection,@ Fifth Edition, Kenneth G. Budinski, 1966, Prentiss Hall, a Simon and Shuster Company, Upper Saddle River, N.J. 07458, pp. 71–71.

It has now been found that more reliable bottles can be produced by a rotation molding process. Rotation molding processes are also well known to those skilled in the art and typically comprise the addition of a pre-measured amount of plastic material in liquid or powder form into a cavity in a mold with the mold then being closed. The amount of material required is determined by the wall thickness desired.

The molding machine then moves the mold into an oven where the mold and subsequently the plastic is brought up to the molding temperature. As the mold is heated, it is rotated continuously about its vertical and horizontal axes. A reverse rotation can also be used to fill small intricacies and hidden areas of the mold. This bi-axial rotation brings all the surfaces of the mold into contact with the puddle of plastic material. The mold continues to rotate within the oven until all the plastic material has been picked up by the hot inside surfaces of the cavity. The mold continues to rotate until the plastic material densifies into a uniform layer of melt.

While continuing to rotate, the mold is cooled. Air or a mixture of air and water cools the mold and the layer of molten plastic material. This cooling process continues until the plastic part has cooled sufficiently to retain its shape. The mold is then moved to an unloading station where the mold is opened and the part removed.

Such processes are well known to those skilled in the art and will not be discussed further.

By such processes, parts of greater wall thickness and having greatly reduced molded-in stress levels are possible. Parts produced by this process for use as the collection bottle are desirably at least 0.20 inches in thickness. The rotation-molded parts are also much more uniform in their thickness than the blow molded parts. Further as a result of the process steps, an embedded or molded-in metal insert can be placed in a wall of the rotation molded collection bottles. With the blow molded bottles it was necessary to attach an electrical conductor by the use of a screw and washer to the exterior surface of the collection bottle.

It was also found that increasing the thickness of the blow molded parts created unacceptable processing difficulties. It has now been surprisingly found that by rotation molding, parts of a suitable thickness can be produced which are much more reliable. The rotation-molded parts are of a greater thickness than the blow molded parts since the strength of the rotation-molded plastics is less than that of the blow-molded plastics. Since the side-wall thickness can be increased, is more uniform and has a lower internal stress level, it has been found that desirable results can be achieved with rotation-molded bottles. Rotation molded bottles have been successfully tested through cycles of at least 30,000 cycles at repetitive vacuum loads from 0 to 80 inches of water. Desirably the wall thickness is at least 0.20 inches and preferably is greater than 0.210 inches. The rotation molding process allows the ability to increase the wall thickness to handle the vacuum loads.

A suitable plastic for the production of the rotation-molded parts is a copolymer polyethylene resin marketed by ROTEC under the trademark ICORENE C517. This resin has a permanent semi-conductivity, low warping and good processing characteristics and a high level of ultraviolet stabilizer. Its permanent anti-static electrical conductivity is over 1,000,000 times more electrically conductive than standard natural rotomolding resin, and it is provided as a black mesh powder (500 microns). The resin typically has the following physical properties:

PHYSICAL PROPERTIES

| PROPERTY | TEST METHOD | UNIT | VALUE |
|---|---|---|---|
| Melt Index (190_C., 2.16 kg) | ISO 1133 | g/10 min. | 6.0 |
| Density | ISO 1183 | g/cm$^3$ | 0.934 |
| Tensile Strength (Yield) | | MPa | 16 |
| Tensile Strength (Break) | | MPa | |
| Elongation | ISO R 527 | MPa | |
| Flexural Modulus | ASTM D790 | MPa | 550 |
| Hardness | ISO R868 | Shore D | 55 |
| Izod Impact Strength | | | |
| Instrumented Impact Strength −20 C. 0 C. +20 C. | ISO 6603-2 | J/mm | (100% ductile) 20 20 18 |
| Vicat Softening Point | ISO 306 A120 | _C. | |
| ESCR(2) | ASTM D1693 | Hrs | |
| Meets FDA Requirements | | | |
| UV-Stabilized | | | Yes |

The bottles of the present invention also include a metal insert adapted to provide a plastic-metal contact. It is convenient to mold a metal insert into rotation molded collection bottles whereas it is not convenient in the blow molding process.

Figure 2:
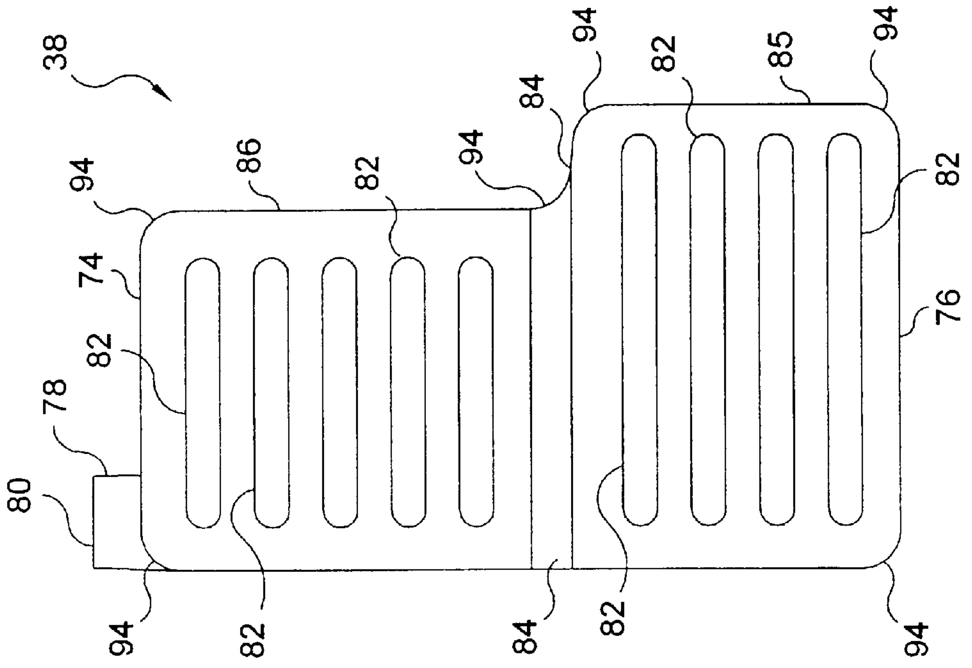
FIG. 2 is a schematic front view of a collection bottle.

In FIG. 2, a side view of a representative collection bottle is shown. A collection bottle 38 is shown having a top 74 and a bottom 76. The bottle is of irregular shape to fit a desired application. The bottle includes an inlet 78 having a top 80. The top is adapted to include a threaded fitting, a shoulder or other types of fittings or the like as required to sealingly couple it to an outlet from a particulates source. Typically ribs 82 are positioned on the wide surfaces of bottle 38 to reduce the tendency of the sides to collapse under the vacuum. As shown, a shoulder 84 is positioned above a lower section 85 of bottle 38 to form a reduced cross-sectional upper section 86.

Figure 3:
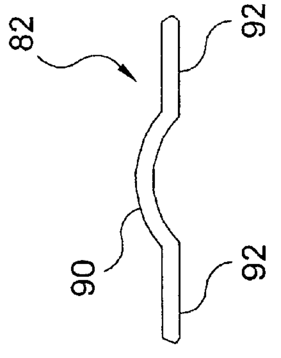
FIG. 3 is a cross-sectional view of a fib as positioned in a side of the mottle of FIG. 2.

In FIG. 3, a section of bottle 38 showing a rib 82 is shown. Rib 82 is formed by an arcuate section 90 positioned in a wall 92 of bottle 38. The rib is shown having an arcuate cross-section 90 but this rib could be any irregularity such as a triangular section, square section, or the like so long as it constitutes an irregularity in the surface of wall 92 sufficient to reduce the flexibility of wall 92.

The corners of bottle 38 are all rounded at rounds 94 so that no squared surfaces are included.

Figure 4:
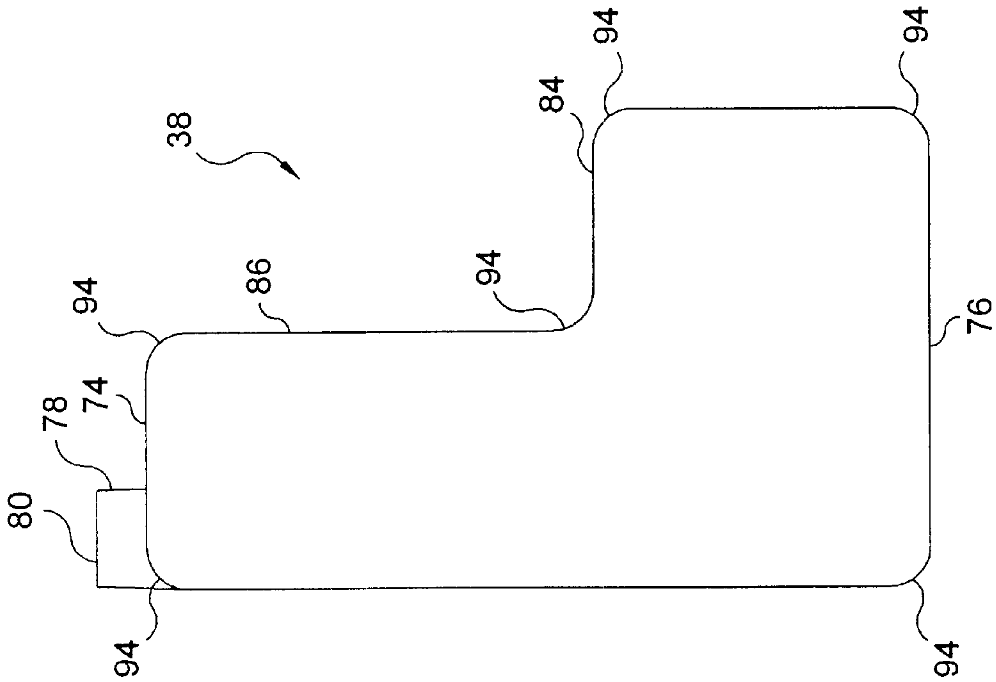
FIG. 4 is a side view of the bottle shown in FIG. 2.

In FIG. 4, an end view of bottle 38 is shown. No ribs are shown in this view for simplicity.

Figure 5:
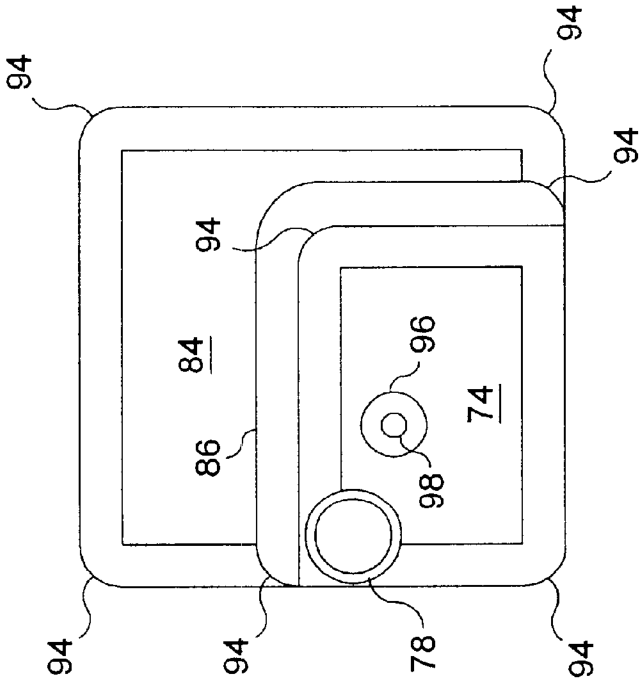
FIG. 5 is a top view of the bottle shown in FIG. 2.

In FIG. 5, a top view of the bottle of FIG. 2 is shown. In this view, a metal insert 96 is shown positioned on top 74 of bottle 38. This metal insert is shown with a threaded opening 98 to receive a threaded connector to electrically discharge static currents from bottle 38.

It will be appreciated that bottle 38 can be of substantially any shape, including round, and that the shape shown is representative as designed for a particular application requiring a collection bottle of this shape. The shape of the bottle will vary routinely depending upon the space available for the collection bottle and the like. Such variations are well known to those skilled in the art. By the use of rotation molding to form the bottle, the formed bottle includes less internal stress and has a greater wall thickness and wall uniformity and as produced is much more reliable.

As indicated previously it is difficult to produce bottles having a greater wall thickness by blow molding and the blow molded bottles are much more susceptible to flexural failure upon repeated application of the vacuum.

Having thus described the invention by reference to certain of its preferred embodiments, it is noted the embodiments described are illustrative rather than limiting in nature and that many variations and modifications are possible within the scope of the present invention.

Having thus described the invention, we claim:

1. A rotation-molded particulates collection bottle for a copier/duplicator machine comprising a rotation molded plastic container having a top and a bottom, a wall thickness of at least about 0.20 inches and a particulates inlet wherein the particulates inlet includes a connector adapted to sealingly connect to a particulates line from a particulates source.

2. The bottle of claim 1 wherein the bottle is adapted to receive particulates as part of a reduced pressure system at a vacuum up to about 60 inches of water.

3. The bottle of claim 1 wherein the bottle is rotation molded of a semi-conductive copolymer of polyethylene.

4. The bottle of claim 1 wherein the bottle includes a molded-in metal insert adapted to provide a plastic-metal contact.

5. The bottle of claim 4 wherein the molded-in metal insert is positioned on the top of the bottle.

6. The bottle of claim 1 wherein the bottle has side walls and said side walls include reinforcing ribs.

7. The bottle of claim 4 wherein the molded metal insert is positioned in a sidewall of the bottle.

8. The bottle of claim 1 wherein the particulates inlet includes a raised rib fitting adapted to sealingly connect to a mating flexible sleeve on a particulates line from a particulates source.

9. The bottle of claim 8 wherein the particulates source is a cyclone separator.

10. The bottle of claim 1 wherein the particulates comprise toner.

11. The method of claim 5 wherein the molded-in metal insert is positioned on the top of the bottle.

12. A rotation-molded particulates collection bottle for receiving separated excess particulates from a copier/duplicator machine comprising a rotation molded plastic container having a top and a bottom, a wall thickness of at least about 0.20 inches and a particulates inlet.

* * * * *